United States Patent [19]

Gattrugeri

[11] Patent Number: 5,681,007
[45] Date of Patent: Oct. 28, 1997

[54] STIFFENING STRUCTURE FOR TUBULAR SHAFTS OF LIGHT ALLOY, RIGID PLASTIC OR THE LIKE, USED FOR ROTATABLY SUPPORTING ROLLS OF VARIOUS MATERIALS, SUCH AS PAPER, FABRIC, STRIP METAL AND THE LIKE

[75] Inventor: Giovanni Gattrugeri, Milan, Italy

[73] Assignee: I.E.S. International Expanding Shafts S.R.L., Milan, Italy

[21] Appl. No.: 625,348

[22] Filed: Apr. 1, 1996

[30] Foreign Application Priority Data

Apr. 3, 1995 [IT] Italy ................... MI95A0669

[51] Int. Cl.⁶ ................................................. B65H 75/10
[52] U.S. Cl. .................................................... 242/613.4
[58] Field of Search .......................... 242/613.4, 613.5, 242/118.31

[56] References Cited

U.S. PATENT DOCUMENTS

| | | | |
|---|---|---|---|
| 1,970,263 | 8/1934 | Washburn | 242/613.5 |
| 3,485,456 | 12/1969 | Weyrich et al. | 242/613.4 |
| 4,254,921 | 3/1981 | Adomeit | 242/613.4 |
| 5,378,964 | 1/1995 | Pretto et al. | |

FOREIGN PATENT DOCUMENTS

| | | | |
|---|---|---|---|
| 327 828 | 6/1919 | Germany . | |
| 16661 | 6/1907 | United Kingdom | 242/613.5 |

*Primary Examiner*—John M. Jillions
*Attorney, Agent, or Firm*—Cushman Darby & Cushman Intellectual Property Group of Pillsbury Madison & Sutro LLP

[57] ABSTRACT

A stiffening structure for tubular shafts of light alloy, rigid plastic or similar materials, usable for rotatably supporting rolls of paper, fabric, metal strip or the like, including a plurality of rectilinear cylindrical steel bars provided with a thread and inserted, by screwing, into correspondingly threaded longitudinal holes provided in possibly angularly equidistant positions within the annular thickness of a tubular shaft of light alloy, particularly aluminium alloy, rigid plastic or a like material. The threaded holes are parallel to each other and located as far as possible from the longitudinal neutral axis of the tubular assembly, so as to enable the cylindrical bars, when screwed into the holes, to oppose the tendency of the shaft to bend during its rotation under load.

8 Claims, 1 Drawing Sheet

STIFFENING STRUCTURE FOR TUBULAR SHAFTS OF LIGHT ALLOY, RIGID PLASTIC OR THE LIKE, USED FOR ROTATABLY SUPPORTING ROLLS OF VARIOUS MATERIALS, SUCH AS PAPER, FABRIC, STRIP METAL AND THE LIKE

BACKGROUND OF THE INVENTION

This invention relates to a composite structure for stiffening tubular shafts of light alloy or the like, either of the smooth external surface type or of the type provided with hydraulic expansion means emerging from the external surface, used for rotatably supporting rolls of material in the form of sheets, webs or the like, whether provided with a tubular core or formed from material wound about itself.

As is well known, shafts for rotatably supporting heavy, large-dimension rolls are generally in the form of cylindrical tubular structures to reduce their weight and to increase their resistance to the bending to which they are inevitably subjected during rotation.

To achieve these results such shafts must be constructed of steel or metal alloy of high rigidity.

In addition, to enable the rolls to be locked onto their supporting shafts, locking-release means are required, these normally consisting, in certain cases, of a chamber or sheath of elastic material housed in the shaft cylindrical cavity and connected to a source of pressurized fluid, so that when they expand they expel pin or tongue elements through holes provided in the surface of the cylindrical structure, these then locking the tubular core of the roll onto the shaft. In other cases, the cylindrical surface of the hollow shaft is provided with angularly equidistant longitudinal recesses of quadrangular or dovetail shape, carrying one or more air chambers which on expanding cause pins to move radially and lock the shaft against the core of the roll, these pins being positioned on the air chambers and being retained by various systems.

In the case of lightweight small-dimension rolls, the roll is locked onto the shaft by forcing wedges coaxial to the shaft into the ends of the core of the roll, i.e. between the shaft surface and the core cylindrical surface.

In all the aforesaid cases, such shafts, in particular for heavy large-dimension rolls, must be constructed of material of high mechanical strength and rigidity, to prevent undesirable bending of the shaft when subjected to high-speed rotation.

To overcome this drawback, steel or metal alloy shafts are used having only a small-diameter bore, this resulting in substantial cost and considerable weight.

SUMMARY OF THE INVENTION

An object of the present invention is therefore to provide a stiffening structure for tubular shafts for supporting rolls of sheet, strip or like material, which is conceived such that a tubular shaft of aluminium alloy, rigid plastic or the like is able to present an increased bending strength, substantially of the same order as that presented by tubular steel shafts, with substantial advantages in terms of reduction in overall finished shaft weight, reduction in production cost and versatility of use. A further object of the invention is to provide a stiffening structure of the aforesaid type which is simple and quick to construct, and is suitable for shafts of light alloy, plastic or the like of variable length and diameter according to requirements, such as to enable them to be used for supporting even heavy large-diameter rolls.

A further object is to provide a stiffening structure applicable to light alloy or plastic tubular shafts either of smooth external surface type or of the type provided with radially equidistant external longitudinal slots of dovetail or similar shape, such as to obtain expanding shafts either of the type with an expansion chamber within their cylindrical cavity or of the type with several chambers housed within said slots, in accordance with the known art.

These and further objects, which will be apparent from the ensuing description, are attained by a stiffening structure for tubular shafts usable for rotatably supporting rolls of sheet paper, plastic, fabric or metal strip or the like, which consists according to the present invention of a plurality of rectilinear cylindrical steel bars provided with a thread and inserted, by screwing, into correspondingly threaded longitudinal holes provided in angularly equidistant or nearly angularly equidistant positions within the annular thickness of a tubular shaft of light alloy, particularly aluminium alloy, rigid plastic or a like material, the threaded holes being parallel to each other and located as far as possible from the longitudinal neutral axis of the tubular assembly, so as to enable the cylindrical bars, when screwed into the holes, to oppose the tendency of the shaft to bend during its rotation under load.

The cylindrical stiffening bars have a length substantially equal to the length of the tubular shaft.

The number of the cylindrical stiffening bars provided is such that with each arched sector between two cylindrical bars there always corresponds at least one or two bars in the diametrically opposite sector, so that during rotation of the shaft under load, those bars in the upper position are able to react, by compression, to the tensile stresses to which the diametrically opposite lower bars are subjected.

In addition, the stiffening structure is applicable both to smooth-surface shafts and to those provided with expansion means for roll locking.

BRIEF DESCRIPTION OF THE DRAWINGS

Further characteristics and advantages of the present invention will be more apparent from the detailed description given hereinafter with reference to the accompanying drawing, which is provided by way of non-limiting example and in which.

DETAILED DESCRIPTION

Figure 1:
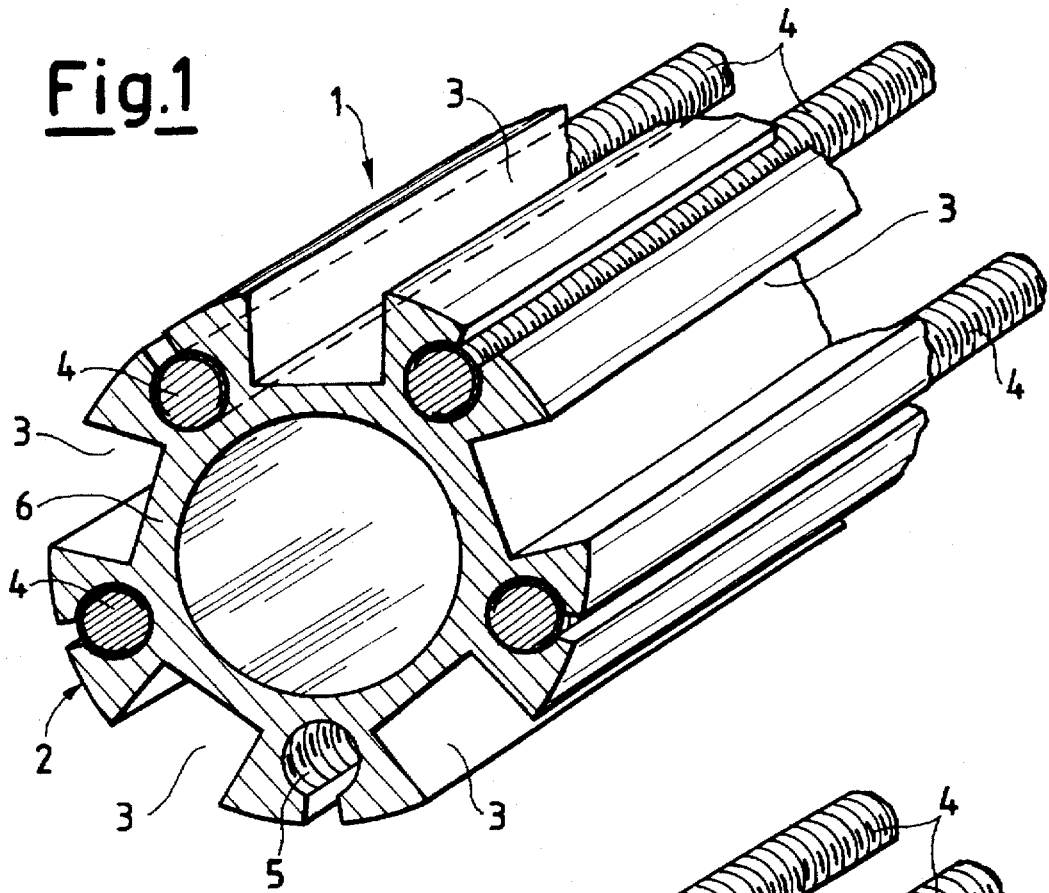
FIG. 1 is a perspective view of a first embodiment of a stiffening structure for a tubular shaft portion of metal alloy or the like, according to the invention.

With reference to the drawing figures, and in particular to FIG. 1, the stiffening structure of the present invention is applied to a tubular shaft, indicated overall by 1 and constructed of rigid plastic material, for example polyvinylchloride (PVC) or aluminium alloy. In the outer cylindrical wall 2 there are provided five longitudinal slots 3 of quadrangular cross-section, which extend practically along the entire length of the shaft and are angularly equidistant.

Figure 2:
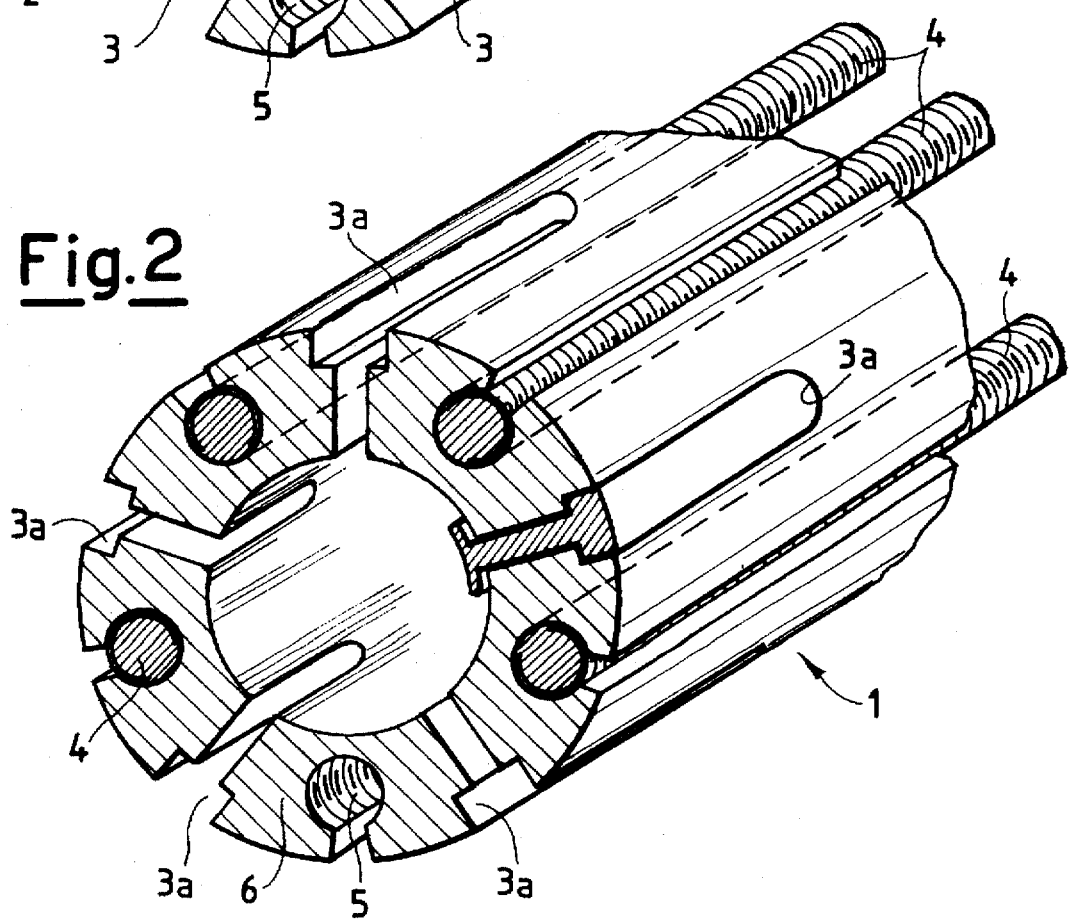
FIG. 2 is a perspective view of a further embodiment of the structure according to the invention.

The slots 3 are provided to contain one or more air chambers and, above these, pin or tongue means which emerge radially from the slots 3 at each inflation of the air chambers; this "expansion" arrangement forms part of the known art and is therefore not further described. An expansion arrangement which is particularly effective in terms of constructional simplicity, component replacement and production cost is that which forms the subject of Italian patent 1100972 in the name of I.E.S. International Expanding Shafts S.r.l. In contrast, FIG. 2 shows a hollow shaft of light alloy, for example aluminium alloy, or plastic material, having a smooth external cylindrical surface and arranged to receive expansion elements which are operated by an air chamber located within the cylindrical cavity of the shaft and emerge from the elongate holes indicated overall by 3a in FIG. 2.

According to the present invention, the stiffening structure for both of said two shafts 1 of light alloy or the like consists basically of a plurality of cylindrical steel bars 4 threaded along their entire length, five bars being shown in the figures by way of example.

Each bar 4 is screwed into a threaded hole 5 provided longitudinally within the thickness of the annular wall 6 of the shaft 1 and extending substantially for the entire length of the shaft.

The holes 5 are positioned angularly equidistant parallel to the longitudinal barycentric axis of the shaft 1. The holes 5 are located at the maximum possible distance from the neutral axis of the tubular assembly 1 in order to give the shaft maximum rigidity and in particular maximum resistance to bending stress during the rotation of the shaft when loaded with a roll.

To further reduce the deflection of the hollow shaft during rotation, it is preferable to use a possibly odd number of stiffening bars compatible with the hollow shaft dimensions or in any event a number such that with each bar attaining an upper position during rotation and hence subjected to compression due to the bending caused by the load, there always corresponds at least one bar in the diametrically opposite position which is subjected to tension. In this manner, the upper and lower bars mutually cooperate to reduce shaft bending.

In practice, it has been found that the aforedescribed stiffening structure is able to provide tubular shafts constructed of low-rigidity materials such as aluminium alloys, rigid plastic and the like with the necessary rigidity, with the advantage of achieving a substantial reduction in the shaft weight over steel shafts for equal dimensions, the reduction attaining and even exceeding 50%. It is apparent that modifications can be made to the described embodiments of the invention, with regard both to the constituent material of the shaft and the number of stiffening bars, without departing the scope of protection of the invention.

I claim:

1. A stiffened tubular shaft for supporting a roll of material, comprising:

a tubular shaft body having an annular wall arranged about a longitudinal axis, and two opposite ends;

a plurality of longitudinal holes extending substantially from end to end in said annular wall parallel to said axis, and each opening through at least one of said ends; each of said holes being internally threaded throughout substantially all of the axial extent thereof; said holes being located as far as possible from said axis within said annular wall;

a plurality of rectilinear cylindrical steel bars which are externally threaded substantially throughout the lengths thereof; each of said bars being threadedly received in a respective one of said holes; said holes being substantially fully occupied along the respective axial extents thereof by said bars; said bars being arranged for opposing bending of said tubular shaft body during rotation under load.

2. The stiffened tubular shaft of claim 1, wherein:
said tubular shaft body is made of a plastic material.

3. The stiffened tubular shaft of claim 1, wherein:
said tubular shaft body is made of aluminum alloy.

4. The stiffened tubular shaft of claim 1, wherein:
said holes are equi-angularly distributed around said axis.

5. The stiffened tubular shaft of claim 4, wherein:
there are an odd number of said holes.

6. The stiffened tubular shaft of claim 1, wherein:
said holes are sufficiently widely angularly distributed around said axis that for each sector of said tubular shaft body defined between a respective neighboring two of said holes, there exists at least one said hole on a diametrically opposite, equally angularly extensive sector of said tubular shaft body.

7. The stiffened tubular shaft of claim 1, further including:
a plurality of radially outwardly opening longitudinally extending slots externally provided in said tubular shaft body said slots being interspersed, circumferentially of said tubular shaft body, with said holes.

8. The stiffened tubular shaft of claim 7, wherein:
each said slot is quadrangular in transverse cross-sectional shape.

* * * * *